United States Patent
Venkataraman

(10) Patent No.: US 10,262,365 B2
(45) Date of Patent: Apr. 16, 2019

(54) METHOD AND A COMPUTERIZED EXCHANGE SYSTEM FOR PROCESSING TRADE ORDERS

(75) Inventor: Kandan Venkataraman, Sydney (AU)

(73) Assignee: Nasdaq Technology AB, Stockholm (SE)

( * ) Notice: Subject to any disclaimer, the term of this patent is extended or adjusted under 35 U.S.C. 154(b) by 1344 days.

(21) Appl. No.: 13/447,463

(22) Filed: Apr. 16, 2012

(65) Prior Publication Data

US 2013/0275285 A1 Oct. 17, 2013

(51) Int. Cl.
*G06Q 40/00* (2012.01)
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
CPC .............................. G06Q 40/04; G06Q 40/06
USPC .......................................................... 705/37
See application file for complete search history.

(56) References Cited

U.S. PATENT DOCUMENTS

| | | | |
|---|---|---|---|
| 6,983,260 B2 | 1/2006 | Hummelgren | |
| 7,747,493 B1 * | 6/2010 | Monroe | 705/35 |
| 7,945,508 B2 * | 5/2011 | Duquette et al. | 705/37 |
| 7,996,511 B1 | 8/2011 | Wiese et al. | |
| 8,275,697 B2 * | 9/2012 | Monroe | 705/37 |
| 8,290,850 B1 * | 10/2012 | Singer | 705/37 |
| 2003/0225672 A1 * | 12/2003 | Hughes et al. | 705/37 |
| 2004/0193526 A1 * | 9/2004 | Singer et al. | 705/37 |
| 2005/0074033 A1 | 4/2005 | Chauveau | |
| 2007/0198397 A1 * | 8/2007 | McGinley et al. | 705/37 |
| 2008/0172321 A1 * | 7/2008 | Bartko | G06Q 40/00 705/37 |
| 2010/0332371 A1 * | 12/2010 | Jensen et al. | 705/37 |
| 2011/0066538 A1 * | 3/2011 | Liberman et al. | 705/37 |
| 2011/0178919 A1 * | 7/2011 | Parsons et al. | 705/37 |
| 2011/0251942 A1 * | 10/2011 | Rosenthal et al. | 705/37 |

(Continued)

FOREIGN PATENT DOCUMENTS

WO 2006/076329 7/2006

OTHER PUBLICATIONS

"McGowan, Michael J., "The Rise of Computerized High Frequency Trading: Use and Controversy", Duke Law and Technology Review 2010, No. 016" (Year: 2010).*

(Continued)

*Primary Examiner* — Eric T Wong
*Assistant Examiner* — Kevin T Poe
(74) *Attorney, Agent, or Firm* — Nixon & Vanderhye P.C.

(57) ABSTRACT

Methods and computerized exchange systems 100 for processing trade orders are disclosed. In the computerized exchange system 100, a sequencer 130 is configured to sequence incoming order entry messages for thereby putting incoming order entry messages in a sequenced order and to send, from the sequencer, order entry message(s) in a sequenced order to a plurality of order book engines 120*a-c*. Upon receipt of the sequenced order entry message(s) in the various order book engines 120-*c*, the plurality of order book engines process the sequenced order entry message(s) substantially in parallel. Various embodiments of the disclosed methods and computerized exchange systems allow for better performance, e.g. in terms of lower latency.

8 Claims, 3 Drawing Sheets

(56) References Cited

U.S. PATENT DOCUMENTS

2012/0246052 A1* 9/2012 Taylor .................. G06Q 40/06
705/37

OTHER PUBLICATIONS

"Hendershott Terrence, Riordan Ryan, "Algorithmic Trading and Information", Department of Economics and Business Engineering Karlsruhe Institute of Technology, 2011 Jun. 2011" (Year: 2011).*
Latternnan, Christoph, "High Frequency Trading Costs and Benefits in Securities Trading and its Necessity of Regulations, Business & Information System Engineering, 2012 Fed, pp. 93-102", (Year: 2012).*
International Search Report dated Dec. 19, 2013 in International Application No. PCT/SE2013/050382.
Written Opinion of the International Searching Authority dated Dec. 19, 2013 in International Application No. PCT/SE2013/050382.
R. Freund et al., A Scheduling Framework for Heterogeneous Computing, Parallel Architectures, Algorithms, and Networks, 1996, Proceedings., Second International Symposium on Beijing, China Jun. 12-14, 1996, pp. 1-9.

* cited by examiner

METHOD AND A COMPUTERIZED EXCHANGE SYSTEM FOR PROCESSING TRADE ORDERS

TECHNICAL FIELD

Embodiments of the present invention presented herein generally relate to a method and a computerized exchange system for processing orders.

BACKGROUND

When trading shares and/or other financial instruments in a computerized exchange, the computerized exchange is generally configured to receive trade orders to create a trade. For instance, the computerized exchange is generally configured to receive bid orders and ask orders and match the bid orders and the ask orders to create a trade. Depending on the conditions associated with the trade, the processes of matching bid and ask orders can sometimes be complex.

Current computerized exchanges normally comprise a central matching engine, typically residing within a central server, and a plurality of gateways, or distributed servers. In such computerized exchange, the typical process can be as follows: order entry messages are received by the computerized exchange, e.g. bid orders and/or ask orders, sent from client devices, e.g. trader terminals, are received via the gateways at the central server. The computerized exchange processes the order entry messages. This processing in the computerized exchange, e.g. central server, may include, among other things, performing order matching based on the received order entry messages. The order processing acknowledgement output from the central server is then typically returned to the client devices via the gateway that forwarded the transaction. The gateway may be required to perform additional processing before the acknowledgement data is returned to the client device. The central server will also disseminate the information from the order message, either in the same form as received or otherwise, to the multiple gateways which perform processing of the order entry information to generate market data output. The market data output is typically forwarded to all client devices through a variety of communication mechanisms, requiring additional processing in the gateways.

This means that a single order entry message firstly requires processing in the central server and then requires reprocessing many times over and in parallel across the various gateway servers.

SUMMARY

In view of the above, an improved method and computerized exchange system would be advantageous and, in particular, a method and computerized exchange system allowing for lower latency and/or improved throughput.

It is therefore a general object of some embodiments of the present invention to provide for an improved method for processing trade orders, which method provides for lower latency and/or higher throughput.

According to an aspect, there is provided a method for processing trade orders. The method is performed by a computerized exchange system. The method comprises: receiving at least one order entry message at at least one of a plurality of order book engines; sending the at least one order entry message from the at least one order book engine to a sequencer; receiving, at the sequencer, the at least one order entry message from the at least one order book engine; sequencing, in the sequencer, the received at least one order entry message by assigning status data and a sequence number to the order entry message for thereby putting incoming order entry messages assigned with different status data in a sequenced order; sending, from the sequencer, the at least one order entry message in a sequenced order to the plurality of order book engines; receiving, at the plurality of order book engines, the at least one order entry message; and processing in substantially parallel, in the plurality of order book engines, the at least one order entry message.

In this method, there is no central server performing many operations or performing relatively demanding operations such as performing order matching based on incoming order entry messages. Instead, a sequencer is used for performing comparatively less demanding operations, such as only the sequencing of received order entry messages by assigning status and sequence number data to the order entry messages and sending the order entry messages in a sequenced order to the plurality of order book engines. The sequencer does not perform as many or any demanding operations that are generally performed by the central server in the current computer exchange systems described in the background. Compared to the computerized exchange system described in the background, the sequencer in this method therefore allows for a lower latency because of reduced processing time in the sequencer compared to the comparatively longer processing time in the previous central server.

Furthermore, in this method the processing of order entry messages is only done in the plurality of order book engines. Compared to the computerized exchange system described in the background, the processing of the order entry message information is not repeated in both a central server and, subsequently, in various gateways. (E.g. the data sent from the central server may in many cases be in a different payload but it will essentially be the order entry information, if not the same message in shape and content.) Rather, the processing of the order entry message information is performed only in the plurality of order book engines. Since the processing of order entry messages is not duplicated, the latency can be reduced. Also, this may allow for higher throughput.

Since the order entry messages are received in a sequenced order (e.g. time stamped) at the plurality of order book engines, the processing of the order entry messages is performed in substantially parallel by the multiple order book engines.

In one embodiment, the processing of the at least one order entry message is performed in all order book engines of the plurality of order book engines.

The processing in substantially parallel in the plurality of order book engines may comprise processing essentially the same at least one order entry message in all of the plurality of order book engines at essentially the same time and with the same logic. This way, all order book engines process the same data. In other words, the computational operations in the respective order book engines are based on the same or essentially the same data and with the same processing logic.

In one embodiment, each of the plurality of order book engines performs additional tasks that are specific to the individual order book engine. In this way, rather than performing all additional tasks in all of the order book engines, each order book engine is individually configured to perform a specific and smaller subset of tasks. For example, one order book engine may process the order entry message to create order management information for outputting to a corresponding client device. Additionally, or alternatively, another order book engine of the plurality of order book engines may process the order entry message to create market data for outputting to a corresponding client device. In one embodiment, the at least one order entry message relates to an order having a hidden volume and at least one of the order book engines processes the at least one order entry message relating to an order having a hidden volume. By having several order book engines, each of which is specifically designed for performing only specific tasks it is possible to reduce the number of computational operations in each of the order book engines. This allows for avoiding unnecessary data processing overhead. Further, this allows for improved overall performance of the computerized exchange system, e.g. in terms of lower latency and/or higher throughput.

In one embodiment, the step of receiving at least one order entry message at one of a plurality order book engines comprises receiving the at least one order entry message from a client device associated with said one of the plurality of order book engines.

In one embodiment, assigning status data comprises assigning a time stamp and a sequence number to the at least one order entry message.

In one embodiment, sequencing the received at least one order entry message comprises recording the at least one order entry message.

It is also a general object of some embodiments of the present invention to provide for an improved computerized exchange system for processing trade orders, which computerized exchange system provides for lower latency and/or higher throughput According to a second aspect, there is provided a computerized exchange system for processing trade orders. The computerized exchange system comprises a sequencer and a plurality of order book engines. The sequencer comprises: a communication interface; a processor; and a memory storing a computer program comprising computer program code which, when run on the processor of the sequencer, causes the sequencer to: receive, via the communication interface, at least one order entry message from at least one of a plurality of order book engines; sequence the received at least one order entry message by assigning status data to the order entry message for thereby putting incoming order entry messages assigned with different status data in a sequenced order; and sending, via the communication interface, the at least one order entry message to the plurality of order book engines. Each of the plurality of order book engines comprises: a communication interface; a processor; and a memory storing a computer program comprising computer program code which, when run on the processor of the order book engine, causes the order book engine to: receive, via the communication interface, the at least one order entry message from the sequencer; and process the at least one order entry message in substantially parallel with the other order book engines of the plurality of order book engines.

The plurality of order book engines may be configured to process essentially the same at least one order entry message in all of the plurality of order book engines at essentially the same time.

In one embodiment, at least one of the plurality of order book engines comprises a memory storing a computer program comprising computer program code which, when run on the processor of the at least one order book engine, causes the at least one order book engine to: receive, via the communication interface, at least one order entry message from a client device associated with the at least one order book engine; and send, via the communication interface, the at least one order entry message from the at least one order book engine to the sequencer.

In one embodiment, each of the plurality of order book engines is configured to perform a task that is specific to the individual order book engine. For example, at least one order book engine may be configured to process the order entry message to create order management data for outputting to a corresponding client device. At least one order book engine may be configured to process the order entry message to create market data for outputting to a corresponding client device. In one embodiment, the at least one order entry message relates to an order having a hidden volume and at least one of the order book engines is configured to process the at least one order entry message relating to an order having a hidden volume.

In one embodiment, the memory storing a computer program comprising computer program code which, when run on the processor of the sequencer, further comprises: computer program code which, when run on the processor of the sequencer, causes the sequencer to assign a time stamp and a sequence number to the at least one order entry message.

In one embodiment, the memory storing a computer program comprising computer program code which, when run on the processor of the sequencer, further comprises: computer program code which, when run on the processor of the sequencer, causes the sequencer to record the at least one order entry message.

The computerized exchange system according to various embodiments of the second aspect provides for one or more of the advantages and/or effects mentioned with respect to the first aspect.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of invention to those persons skilled in the art. Like numbers refer to like elements throughout the description.

Figure 1:
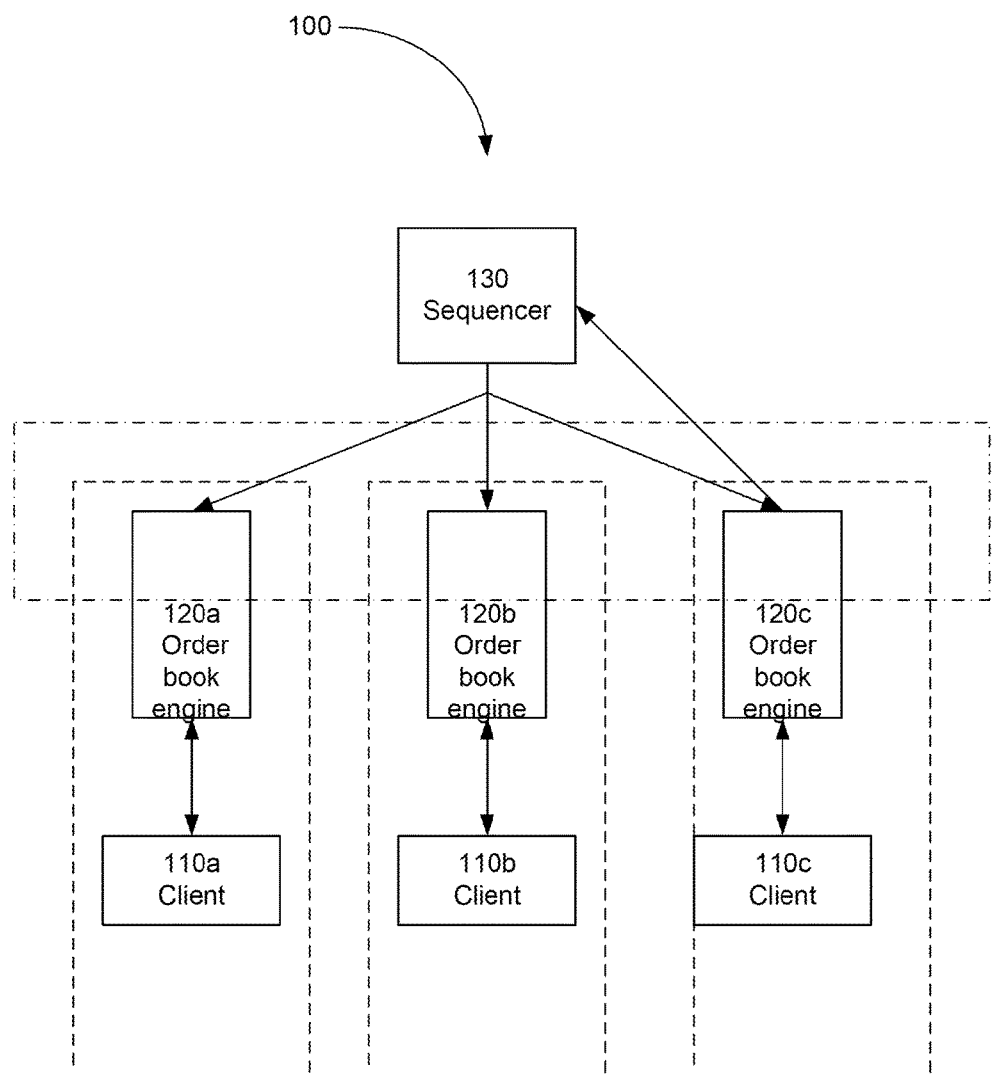
FIG. 1 is a schematic diagram illustrating a computerized exchange system according to an exemplary embodiment of the invention.

An example trading environment is illustrated in FIG. 1. With reference to FIG. 1, an example embodiment of a computerized, or automated, exchange 100 according to embodiments of the invention is discussed.

A number of clients 110 or client devices herein denoted client 110a, client 110b, and client 110c are operable to communicate with the exchange 100. Thus, traders or market participants can participate on the market by means of the clients 110a-c communicating with the computerized exchange 100 e.g. via a communication network. More particularly, the client devices 110a-c are operable to communicate with order book engines (also known as matching engines) 120a-c. In the disclosed embodiment, client device 110a can communicate with order book engine 120a, client device 110b can communicate with order book engine 120b and so forth. The clients 110a-c may connect to its respective order book engine in any known manner, such as via high speed data lines, high speed communication servers or via the Internet to mention only a few examples. Data lines, e.g. high speed data lines, may establish direct connection between the client 110a-c and the respective order book engines 120a-c. Connection can, additionally or alternatively, be established between the client 110a-c and the order book engines 120a-c by configuring networks, e.g. high speed networks, or communication servers at strategic access points in locations where traders are physically located. The Internet is a third communications means enabling traders using clients 110a-c using data connections connected to the Internet. Consequently, traders can be located anywhere and at any time establish a connection with the computerized exchange system 100.

As is illustrated in FIG. 1, the computerized exchange 100 comprises a sequencer 130, or central sequencer, and a plurality of order book engines 120a-c. The plurality of order book engines 120a-c may be mirrors of each other in terms of hardware and/or software. The order book engines 120a-c are configured to maintain order books. An order book can be maintained in any known manner and how order books are maintained will therefore not be further explained here. In contrast to current computerized exchanges described in the background, the exemplary computerized exchange 100 illustrated in FIG. 1 comprises no central server having a central order book. Instead, the order books are distributed such that each of the several order book engines maintains their respective order books. Also in contrast to current computerized exchanges, the illustrated computerized exchange 100 comprises no central server performing the many different operations as is done in current exchanges described in the background section. Rather, the exemplary computerized exchange of figure 100 comprises a sequencer, which performs considerably fewer operations compared to the previous central server. In particular, and as will be further detailed herein, the sequencer 130 is configured to receive order entry messages from an order book engine, sequence the received order entry messages, e.g. by assigning status data to the order entry messages, for thereby putting incoming order entry messages assigned with different status data in a sequenced order, and subsequently sending the order entry messages to the plurality of order book engines.

With reference to FIG. 1, an exemplary trading process will be described. An order entry message, e.g. in the form of a bid order or an ask order, is sent from a client device, e.g. client device 110c, to an order book engine 120c. The order book engine 120c receives 210 the order entry message(s) and forwards 211, i.e. sends, the order entry message(s) to the sequencer 130. The sequencer 130 then receives 212 the forwarded order entry message(s). Subsequently, the sequencer 130 sequences 213 the received order entry message(s) by assigning status data, e.g. by assigning a time stamp, to the order entry message(s) for thereby putting incoming order entry messages assigned with different status data in a sequenced order. The sequencer may also record incoming order entry messages. Thereafter, the sequencer 130 broadcasts 214, i.e. sends, order entry messages in a sequenced order to the plurality order book engines 120a-c. The order book engines 120a-c thereafter receives 215 the order entry messages from the sequencer 130 in parallel and at substantially the same time. Upon receiving the order entry messages in the sequenced order from the sequencer 130, the plurality of order book engines processes 216 the order entry messages in substantially parallel. By introducing a sequencer 130, or a central sequencer, and utilizing parallel processing of order entry messages in a plurality of order book engines 120a-c it is possible to reduce the number of processing steps in the transaction round-trip compared to current computerized exchange systems described in the background. Thereby, the latency can be decreased.

The processing in substantially parallel in the plurality of order book engines 120a-c may comprise processing essentially the same order entry messages in all of the plurality of order book engines 120a-c at essentially the same time. This way, all order book engines 120a-c can process the same or essentially the same data. In other words, the computational operations in the respective order book engines 120a-c are based on the same or essentially the same data.

In one embodiment, each of the plurality of order book engines performs a task that is specific to the individual order book engine 120a-c. In this way, rather than performing many different tasks in each of the order book engines 120a-c, each order book engine may be individually configured to perform only one task (or only a few tasks). For example, one order book engine 120a may process order entry messages to create order management data (for example, according to the OUCH protocol) for outputting to a corresponding client device 110a. Another order book engine 120b may process order entry messages to create market data (e.g. according to the ITCH protocol) for outputting to a corresponding client device. Yet another order book engine may be specially designed for processing order entry messages of a type having a hidden volume, as described in the U.S. Pat. No. 6,983,260. By having several order book engines, each of which is specifically designed for performing specific tasks it is possible to reduce the number of computational operations in each of the order book engines 120a-c. This allows for avoiding unnecessary data processing overhead. Further, this allows for improved overall performance of the computerized exchange system, e.g. in terms of lower latency and/or higher throughput.

Figure 2:
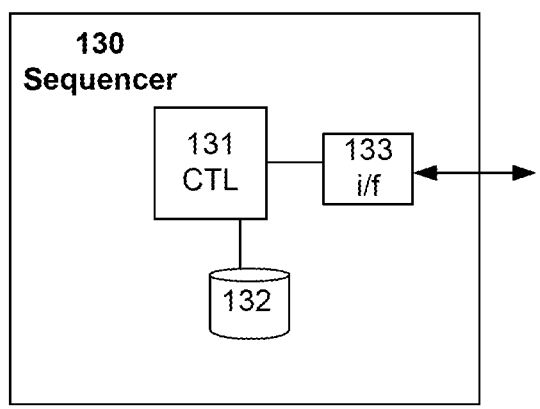
FIG. 2 is a schematic diagram illustrating some modules of an embodiment of a sequencer illustrated in FIG. 1.

FIG. 2 is a schematic diagram illustrating some modules of an embodiment of the sequencer 130 illustrated in FIG. 1. A processor 131 is provided using any suitable central processing unit (CPU), microcontroller, digital signal processor (DSP), etc., capable of executing computer program comprising computer program code, the computer program being stored in a memory 132. The memory 132 can be any combination of read and write memory (RAM) and read only memory (ROM). The memory may also comprise persistent storage, which, for example, can be any single one or combination of magnetic memory, optical memory, or solid state memory or even remotely mounted memory. The sequencer 130 further comprises a communication interface 133 arranged for communication with the order book engines 133 and, optionally, additional devices. For example, the sequencer 133 may be arranged for communication using the known User Datagram Protocol (UDP). With UDP, the sequencer 131 can send (and receive) messages, sometimes referred to as datagrams, to other devices on an Internet Protocol (IP) network without requiring prior communications to set up special transmission channels or data paths. UDP uses a simple transmission model without implicit handshaking dialogues for providing reliability, ordering, or data integrity.

The sequencer 131 is arranged to receive order entry messages via its communication interface 133 from order book engines. Furthermore, the sequencer 131 is arranged to send, via its communication interface 133, order entry messages that have been sequenced by means of the sequencer 131 to order book engines.

In one embodiment, when the above-mentioned stored computer program code is run in the processor 131, this causes the sequencer 131 to receive, via its communication interface 133, one or more order entry messages from at least one of the plurality of order book engines; sequence the received order entry message(s) by assigning status data, e.g. assigning a time stamp, to the order entry message(s) for thereby putting incoming order entry messages assigned with different status data in a sequenced order; and sending, via the communication interface 133, the order entry message(s) to the plurality of order book engines in a sequenced order. Optionally, the sequencing also comprises recording the order entry message(s), e.g. in memory 132.

Figure 3:
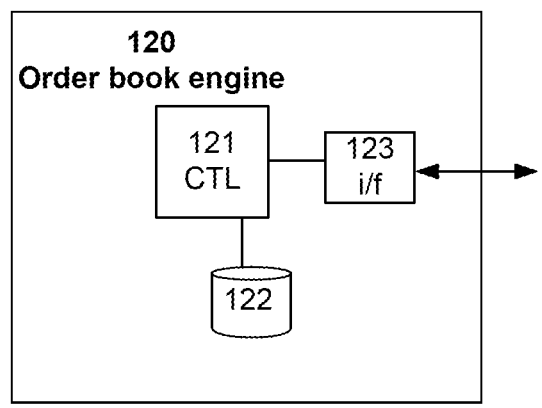
FIG. 3 is a schematic diagram illustrating some modules of an embodiment of an order book engine illustrated in FIG. 1.

FIG. 3 is a schematic diagram illustrating some modules of an embodiment of one of the order book engines 120a-c illustrated in FIG. 1. The different order book engines 120a-c may be mirrors of each other in terms of hardware and/or software and so the various order book engines 120a-c comprise the same or essentially the same or similar components. A processor 121 is provided using any suitable central processing unit (CPU), microcontroller, digital signal processor (DSP), etc., capable of executing computer program comprising computer program code, the computer program being stored in a memory 122. The memory 122 can be any combination of read and write memory (RAM) and read only memory (ROM). The memory may also comprise persistent storage, which, for example, can be any single one or combination of magnetic memory, optical memory, or solid state memory or even remotely mounted memory. The order book engine 120 further comprises a communication interface 123 arranged for communication with the sequencer 130. Also, the communication interface may be arranged for communication with respective client devices associated with the order book engine in question. For example, the order book engine 120 may be arranged for communication using the known User Datagram Protocol (UDP). With UDP, the order book engine 121 can receive (and/or send) messages, sometimes referred to as datagrams, to other devices on an Internet Protocol (IP) network without requiring prior communications to set up special transmission channels or data paths.

In one embodiment, when the above-mentioned stored computer program code is run in the processor 121, this causes the order book engine 121 to receive, via the communication interface 123, one or more order entry message(s) from the sequencer 130; and process order entry message(s) in substantially parallel with the other order book engines of the plurality of order book engines.

In some embodiments, the several order book engines 120a-c illustrated in FIG. 1 are configured to process essentially the same order entry message(s) in all of the plurality of order book engines 120a-c at essentially the same time.

At least one of the plurality of order book engines shown in FIG. 1 additionally comprises a memory 122 storing a computer program comprising computer program code which, when run on the processor of this order book engine, causes this order book engine to: receive, via the communication interface 123, an order entry message(s) from a client device associated with this order book engine; and send, via the communication interface 123, the order entry message(s) from this order book engine to the sequencer 130.

Each order book engine 120 is configured to perform a task that is specific to the individual order book engine 120. In this way, rather than performing many different tasks in each of the order book engines 120a-c, each order book engine may be individually configured to perform only one task (or, at least only very few tasks). For example, one order book engine 120a may be specially configured to process order entry messages to create order management data (for example, according to the OUCH protocol) for outputting to a corresponding client device 110a. Another order book engine 120b may be particularly configured to process order entry messages to create market data (e.g. according to the ITCH protocol) for outputting to a corresponding client device. Yet another order book engine may be specially designed for processing order entry messages of a type having a hidden volume, as described in the U.S. Pat. No. 6,983,260. By having several order book engines, each of which is specifically designed for performing specific tasks it is possible to reduce the number of computational operations in each of the order book engines 120a-c.

Figure 4:
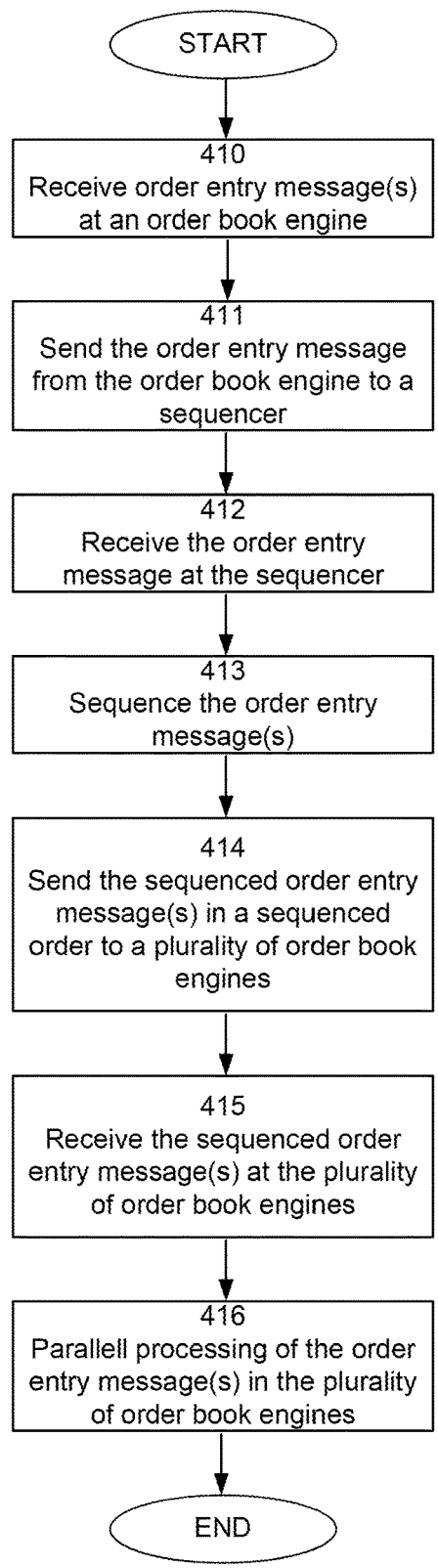
FIG. 4 is flow chart illustrating a method according to an embodiment of the invention.

FIG. 4 is a flow chart illustrating a method according to one embodiment executed in a computerized exchange system. The method illustrated in FIG. 2 allows for one or more of the advantages and/or effects mentioned with respect to the computerized exchange system 100 described in connection with FIGS. 1, 2 and 3. In an initial step 410, an order book engine receives an order entry message. The order book engine may receive the order entry message from a client device associated with the plurality of order book engines, e.g. a client device denoted 110c which is associated with order book engine 120c. Next, the order book engine forwards, i.e. sends, the order entry message to a sequencer in a step 411. In the subsequent step 412, the sequencer receives the forwarded order entry message. The sequencer then sequences the order entry message in step 413. This is done by assigning status data to the order entry message for thereby putting incoming order entry messages assigned with different status data in a sequenced order. For example, assigning status data to the order entry message may comprise assigning a time stamp to the order entry message. Additionally, or alternatively, the sequencing may comprise recording the order entry message. After the step 413 of sequencing, the sequencer broadcasts, i.e. sends, the order entry message to the plurality of order book engines in step 414. Since incoming order entry messages are assigned with status data, e.g. in the form of time stamps, these can be sent to the order book engines in a sequenced order. Or, alternatively, the order book engines can put incoming order entry messages in the correct, or proper, order in dependence of the assigned status data. In step 415, the order entry message is received by the plurality of order book engines, preferably but not necessarily by all order book engines. In a final step 416, the order entry message(s) is/are processed in substantially parallel in the plurality of order book engines. In step 416, all order book engines may process essentially the same order entry message(s) at essentially the same time.

Also when implementing the method illustrated in FIG. 4, each of the plurality of order book engines may perform certain tasks that are specific to the individual order book engines as described hereinabove with respect to FIGS. 1, 2 and 3, respectively.

Various embodiments of the invention described hereinabove allow for reduced latency and/or higher throughput. Some embodiments can allow for a reduction in latency from 800 ms to 40 ms compared to the current exchange systems described in the background section. This is a considerable improvement for computerized exchange systems. Thus, various embodiments of the present invention meet the continuous demand from traders and others for lower latency and better performance of computerized exchange systems.

Although the present invention has been described above with reference to specific embodiments, it is not intended to be limited to the specific form set forth herein. Rather, the invention is limited only by the accompanying claims and, other embodiments that the specific above are equally possible within the scope of the appended claims. Also, when used herein the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method for processing data order entry messages, the method being performed by a computerized exchange and comprising:
   each of a plurality of data order book hardware processors receiving, via a hardware gateway processor of the computerized exchange, a plurality of data order entry messages at;
   sending the received order entry messages from each of the plurality of data order book hardware processors to a common sequencer processor coupled to each of the plurality of data order book hardware processors;
   receiving, at the common sequencer processor, the data order entry messages from the plurality of data order book hardware processors;
   sequencing, in the common sequencer processor, the received data order entry messages by assigning status data including a time stamp to each of the received data order entry messages to put the received data order entry messages assigned with different status data in a sequenced order;
   sending, from the common sequencer processor, the received data order entry messages in a sequenced data order to the plurality of data order book hardware processor;
   receiving, at a first one of the order book hardware processors and a second one of the order book hardware processors, the sequenced data order entry messages,
   processing, by the first order book hardware processor, the sequenced order entry messages to create order management data that includes order acceptance, rejection, execution, or cancellation information corresponding to the order entry messages and outputting the management information to one or more client devices; and
   processing independently of the processing in the first order book hardware processor and in substantially parallel, in the second order book hardware processor, the sequenced data order entry messages to create data that includes status information for multiple data orders entered in the computerized exchange and outputting the status information to one or more client devices.

2. The method according to claim 1, wherein the processing in substantially parallel in the plurality of data order book hardware processors comprises processing essentially the same data order entry messages in all of the plurality of order book hardware processors at essentially the same time.

3. The method according to claim 2, wherein the at least one order entry message relates to an order having a special parameter and, wherein:
   a third one of the order book hardware processors processes at least one order entry message relating to an order having the special parameter.

4. The method according to claim 1, wherein the step of receiving the plurality of data order entry messages comprises:
   receiving the plurality of data order entry messages from one or more client devices associated with one or more of the plurality of data order book hardware processors.

5. The method according to claim 1, wherein sequencing the received the plurality of data order entry messages comprises:
   recording, in non-volatile memory, the plurality of data order entry messages.

6. A computerized exchange system for processing data order entry messages, comprising:
   a common sequencer comprising:
      a common sequencer hardware communication interface;
      a common sequencer processor; and
      a common sequencer memory configured to store a computer program comprising computer program code which, when run on the common sequencer processor, causes the common sequencer to:
         receive, via the common sequencer hardware communication interface, a plurality of data order entry messages from a plurality of order book hardware processors coupled to the common sequencer hardware interface by a data communications medium;
         sequence the received plurality of data order entry messages by assigning status data including a time stamp to each of the plurality of data order entry messages to put incoming order entry messages assigned with different status data in a sequenced order; and
         sending, via the common sequencer communication hardware interface and the data communications medium, the plurality of data order entry messages in the sequenced order to the plurality of order book hardware processors;
   a first one of the order book hardware processors, coupled by the data communications medium to the common sequencer, and comprising:
      a first hardware communication interface;
      a first data processor; and
      a first memory configured to store a computer program comprising computer program code which, when run on the first data processor of the first order book hardware processor, causes the first order book hardware processor to:
         receive, via the data communications medium and the first hardware communication interface, the sequenced data order entry messages from the common sequencer;
         process the sequenced data order entry messages to create order management data that includes order acceptance, rejection, execution, or cancellation information corresponding to the data order entry messages; and output the management data to one or more client devices;

a second one of the order book hardware processors, coupled by the data communications medium to the common sequencer, and comprising:

a second hardware communication interface;

a second data processor; and a second memory configured to store a computer program comprising computer program code which, when run on the second data processor of the second order book hardware processor, causes the second order book hardware processor to:

receive, via the data communications medium and the second hardware communication interface, the sequenced data order entry messages from the common sequencer;

process independently of the processing in the first order book hardware processor and substantially in parallel with the processing in the first order book hardware processor the sequenced data order entry messages to create data that includes status information for multiple data orders entered in the computerized exchange; and output the status information to one or more client devices.

7. The computerized exchange system according to claim 6, wherein a third one of the data order book hardware processors is configured to process at least one order entry message relating to an order having a special parameter.

8. The computerized exchange system according to claim 6, wherein the common sequencer memory storing a computer program comprising computer program code which, when run on the common sequencer processor, further comprises:

computer program code which, when run on the common sequencer data processor, cause the common sequencer to:

record the plurality of data order entry messages in non-volatile memory.

* * * * *